Feb. 18, 1958  A. C. STOVER  2,823,926
SUSPENSION SYSTEM FOR ROAD VEHICLES
Filed Jan. 25, 1954  5 Sheets-Sheet 1
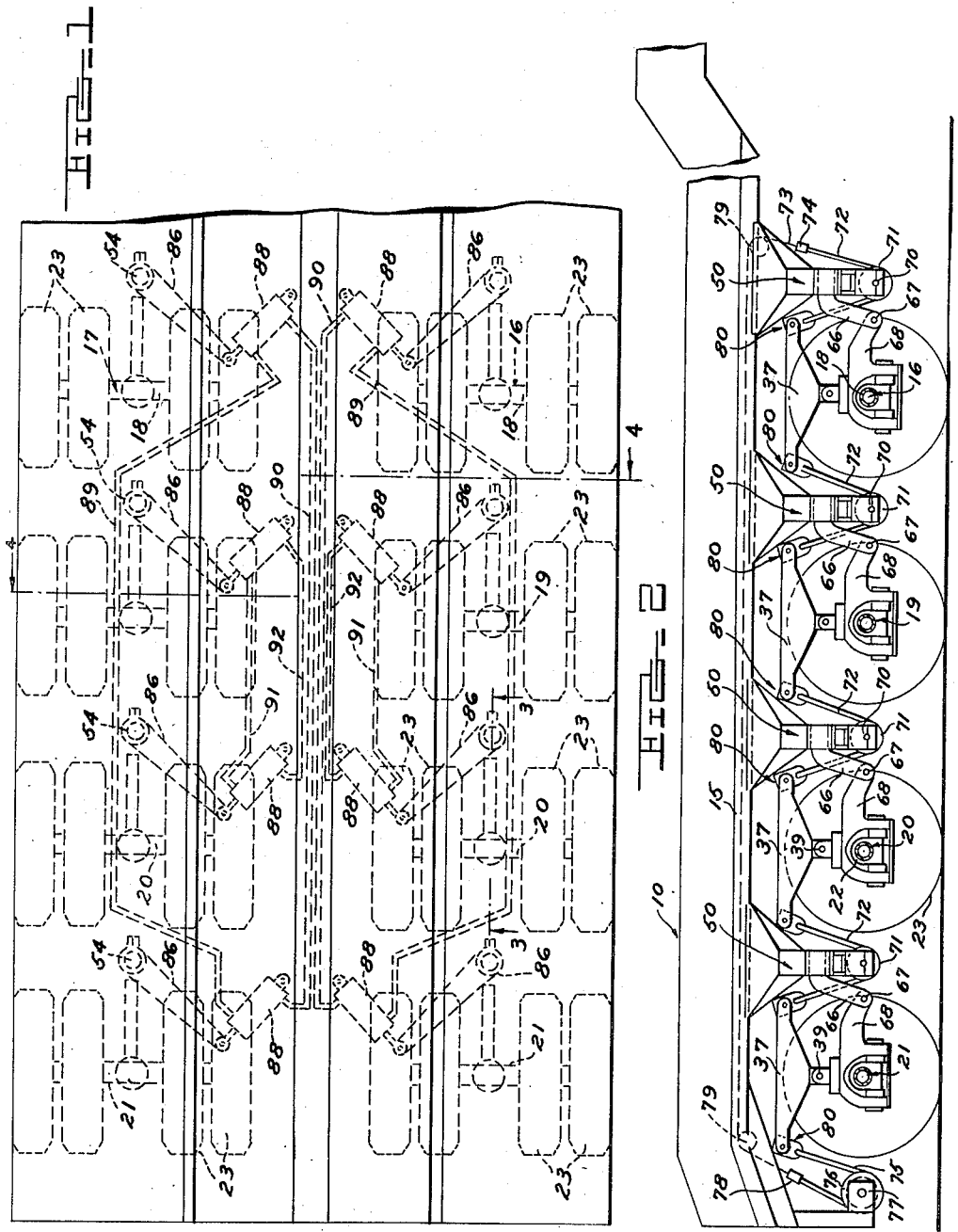
INVENTOR.
ANCIL C. STOVER
BY
ATTORNEYS

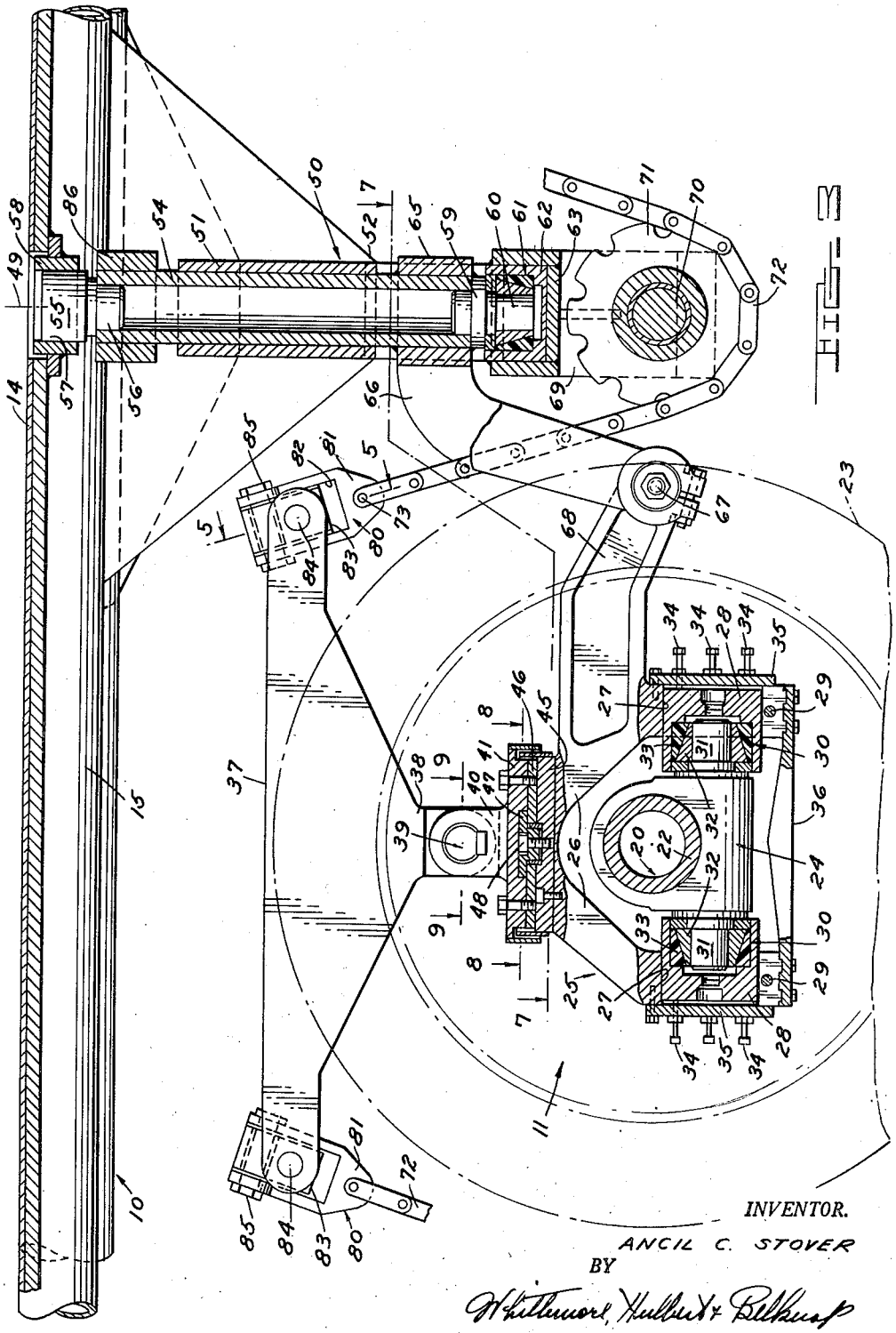

Feb. 18, 1958 A. C. STOVER 2,823,926
SUSPENSION SYSTEM FOR ROAD VEHICLES
Filed Jan. 25, 1954 5 Sheets-Sheet 3
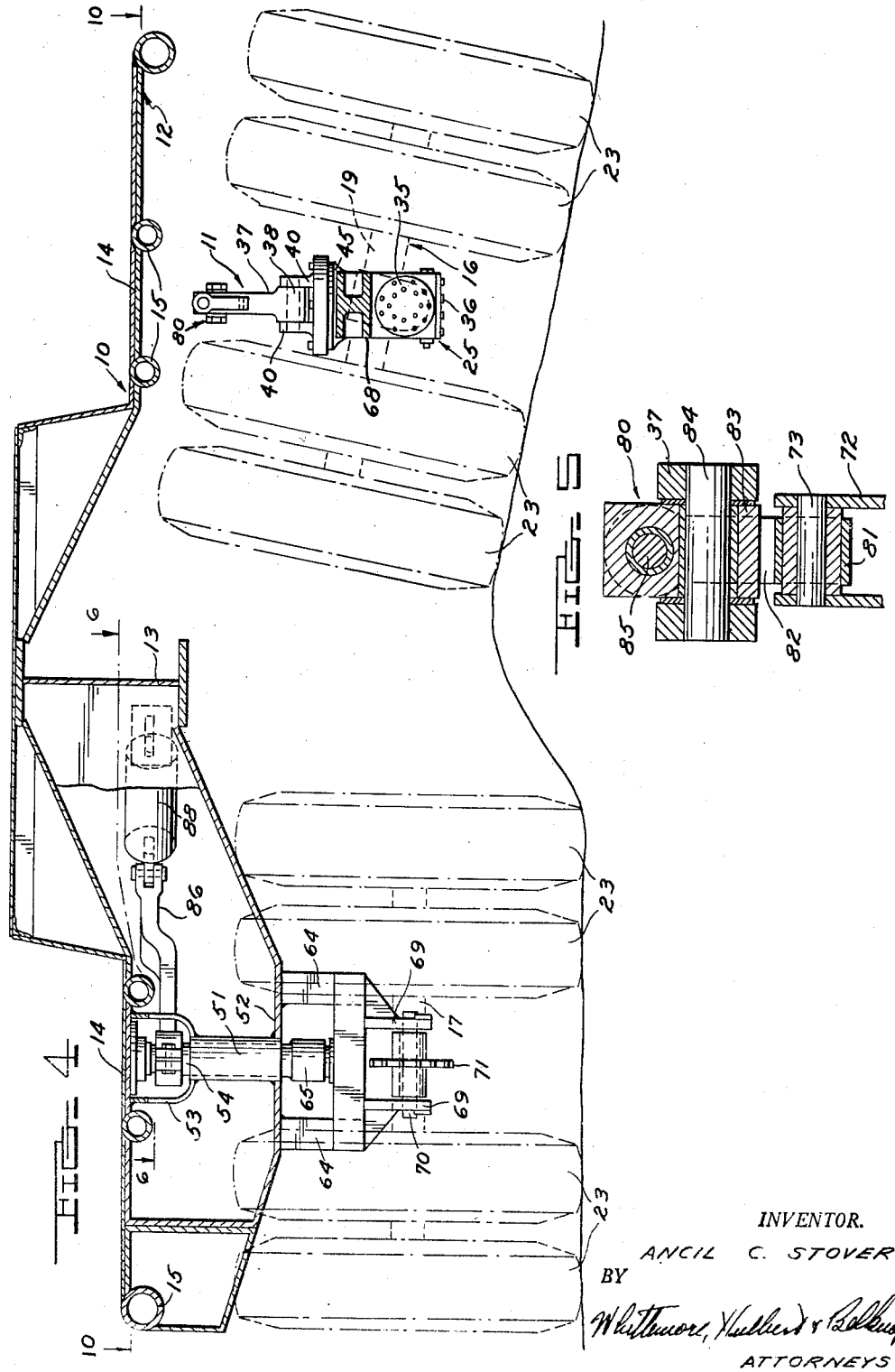
INVENTOR.
ANCIL C. STOVER
BY
*Whitmore, Hulbert & Belknap*
ATTORNEYS Feb. 18, 1958 A. C. STOVER 2,823,926
SUSPENSION SYSTEM FOR ROAD VEHICLES
Filed Jan. 25, 1954 5 Sheets-Sheet 4
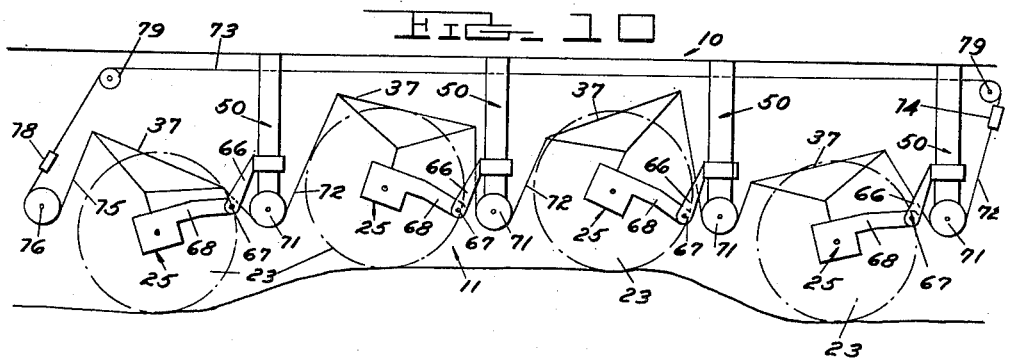
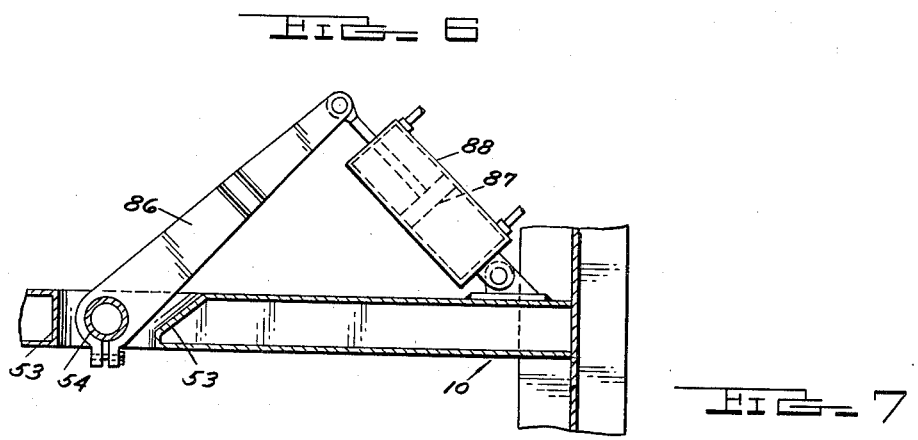
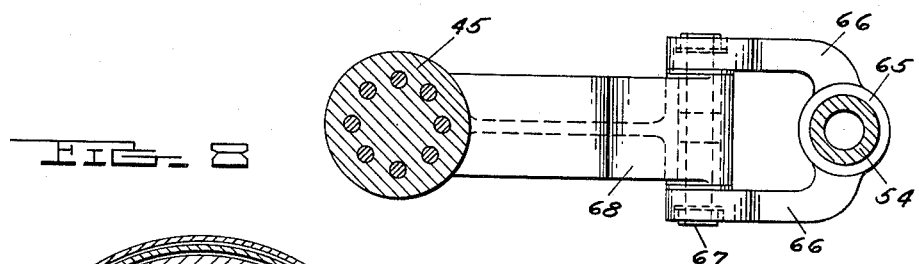
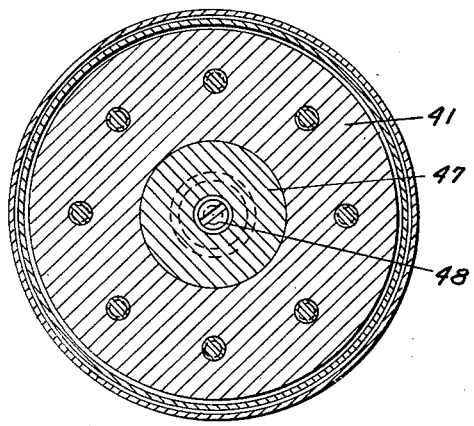
INVENTOR.
ANCIL C. STOVER
BY
*Whittemore, Hulbert & Belknap*
ATTORNEYS

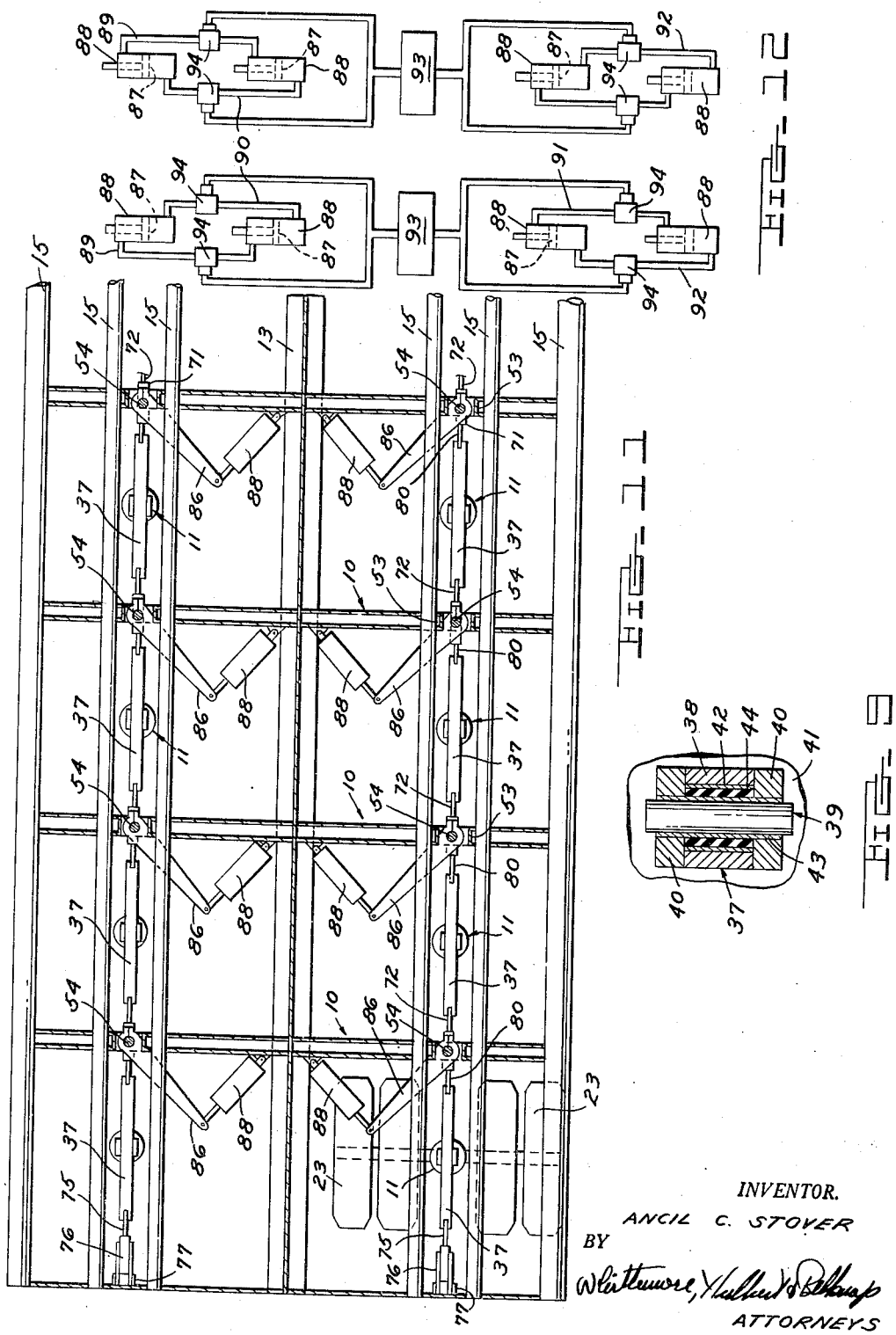

United States Patent Office 2,823,926
Patented Feb. 18, 1958

2,823,926

SUSPENSION SYSTEM FOR ROAD VEHICLES

Ancil C. Stover, Louisville, Ky., assignor to William A. Eisenhauer, William P. Ellwood, Ida J. Eisenhauer, and Leigh E. Eisenhauer, copartners doing business as The Eisenhauer Manufacturing Company, Van Wert, Ohio Application January 25, 1954, Serial No. 405,817

28 Claims. (Cl. 280—104.5)

This invention relates generally to vehicles and refers more particularly to improvements in vehicles of the type equipped with a plurality of tandemly arranged axles.

It is an object of this invention to provide a vehicle capable of transporting exceptionally heavy loads over extremely rough and irregular terrain such as is often encountered in off-highway use.

It is another object of this invention to provide a vehicle wherein the suspension means for the individual axle assemblies are in effect serially connected in a manner to permit a wide range of relative vertical travel of the sprung and unsprung assemblies of the vehicle for a given vertical clearance between the assemblies.

It is still another object of this invention to provide a structure of the above type wherein the tandem axles are supported for turning movement about vertical axes arranged to provide the axles with a caster effect and thereby permit proper tracking of the ground engaging wheels on the respective axles.

It is a further object of this invention to provide stabilizing means which controls turning movement of the axles about their respective vertical axes in a manner such that external forces other than the natural turning forces applied to the ground engaging wheels are prevented from turning said axles.

It is still a further object of this invention to provide a vehicle possessing the foregoing features and at the same time having mounting means for the respective axles permitting relatively free vertical and tilting movements of said axles.

The foregoing as well as other objects will be made more apparent as this description proceeds especially when considered in connection with the accompanying drawings, wherein Figure 1 is a semi-diagrammatic fragmentary plan view of a vehicle constructed in accordance with this invention;

Figure 2 is a semi-diagrammatic side elevational view of the vehicle shown in Figure 1;

Figure 3 is an enlarged sectional view taken on the line 3—3 of Figure 1;

Figure 4 is an enlarged sectional view taken on the line 4—4 of Figure 1;

Figure 5 is a sectional view taken on the line 5—5 of Figure 3;

Figure 6 is a sectional view taken on the line 6—6 of Figure 4;

Figure 7 is a sectional view taken on the line 7—7 of Figure 3;

Figure 8 is a sectional view taken on the line 8—8 of Figure 3;

Figure 9 is a sectional view taken on the line 9—9 of Figure 3;

Figure 10 is a diagrammatic view illustrating the suspension system;

Figure 11 is a semi-diagrammatic plan view of the vehicle shown in Figure 1 having the platform removed for the sake of clearness; and Figure 12 is a diagram of the stabilizing systems provided for the tandemly arranged axles.

The vehicle selected herein for the purpose of illustrating the present invention is in the form of a trailer and is especially designed to transport exceptionally heavy loads over extremely irregular terrain such as is encountered in off-highway use. The vehicle comprises a sprung assembly 10 and an unsprung asembly 11. The sprung assembly 10 has a load supporting deck 12 of any suitable construction and has a longitudinally extending centrally disposed structural member 13 for reinforcing the deck 12. In the present instance, the deck 12 is designed for supporting vehicles such as military tanks and the like and for this purpose has longitudinally extending runways 14 at opposite sides thereof. The runways 14 are reinforced by tubular frame bars 15 which extend for the full length of the runways in lateral spaced relationship and are welded to the latter. It will of course be understood that the deck structure 12 may be of any suitable design to meet specified requirements and, hence, is not shown in detail herein.

The unsprung assembly 11 comprises a multiplicity of tandemly positioned axle assemblies arranged in two groups designated generally herein by the reference numerals 16 and 17. As shown in Figure 1 of the drawings, the axle assemblies in the group 17 are located beneath the sprung assembly 10 at one side of the latter and the axle assemblies in the group 16 are located beneath the opposite side of the sprung assembly. Corresponding axles of the assemblies in both groups are arranged in axial alignment and are independently supported in a manner to be presently described in detail. Since both groups of axle assemblies are identical in construction, only one group need be described in detail.

With the above in view, particular attention is called to Figure 2 of the drawings wherein it will be noted that the group 16 comprises four tandemly arranged axle assemblies designated by the numerals 18, 19, 20 and 21. Although four axle assemblies are selected herein for the purpose of illustrating the present invention, it will of course be understood that the number of axle assemblies may be varied depending upon the requirements. Regardless of the number of axle assemblies provided in each group, it will be noted that each axle assembly may be of the same construction and, with this in view, reference is made to Figure 3 of the drawings wherein the axle 20 and associated parts are shown in detail.

The axle assembly 20 has a tubular axle 22 and dual ground engaging wheels 23 are respectively rotatably supported on opposite ends of the axle 22 in any suitable manner. Secured to the axle 22 midway between opposite ends of the latter is a journal part 24 supported by a bracket 25. The bracket 25 is located above the axle 22 and has depending arms 26 which respectively extend downwardly at opposite sides of the axle 22. The lower ends of the arms 26 have axially aligned openings 27 and retainers 28 are respectively mounted within the openings 27. The portions of the arms 26 at the bottom of the openings 27 are longitudinally split for the full axial extent of the arms and tie-bolts 29 extend transversely through the split portions of the arms to clamp the retainers 28 in place.

Supported within each retainer 28 is a composite journal 30 having aligned axes extending perpendicular to the axle and providing bearings for suitable trunnions 31 formed on the journal part 24. The construction is such as to permit tilting or swinging movement of the axle 22 in a vertical plane about the aligned axes of the journals 30.

The specific construction of the journal 30 and associated parts forms the subject matter of my co-pending application, Serial No. 386,036, entitled "Bearing Assembly" and filed October 14, 1953, now Patent No. 2,732,267, dated Jan 24, 1956. Briefly, each journal 30 comprises a pair of concentric bearing rings 32 and 33. The inner bearing rings 32 are preferably formed of metal, such for example, as hardened steel, and the outer bearing rings 33 are formed of a non-metallic material, such for example as a phenolic resin. The adjacent surfaces of the bearing rings are tapered in the manner shown so that relative axial movement of the bearing rings will serve to take up wear or lost motion. In the present instance, the outer bearing rings 33 are capable of being moved axially relative to the inner bearing rings 32 by suitable adjusting screws 34 respectively mounted on plates 35 which are in turn respectively secured to the arms 26 to close the outer ends of the openings 27. The arrangement is such that tightening of the screws 34 causes axial inward movement of the retainers 28 to in turn effect the adjustment of the outer bearing rings 33 required to take up any lost motion that may occur in the assembly after long periods of use. It will of course be understood that the tie-bolts 29 must be loosened before the retainers 28 are adjusted by the screws 34.

The lower ends of the arms 26 are connected together by a tie-plate 36. The tie-plate 36 serves as a reinforcement for the bracket 25 and prevents deflection of the arms 26 under severe bearing loads.

The axle assembly 20 also comprises a suspension member 37 which extends fore and aft of the unsprung assembly above the axle 22 and may either be in the form of a semi-elliptical spring or in the form of a rigid walking beam. This member will be referred to hereinafter as a suspension beam and it is to be understood that the word "beam" is considered to cover both a semi-elliptical spring and a walking beam. With this in mind, reference is again made to Figure 3 wherein it will be noted that the beam 37 has a depending portion 38 midway between opposite ends and this depending portion is pivoted to the top of the bracket 25 by a pin 39 having its axis extending parallel to the axis of the axle 22 and located in a common vertical plane with the axis of the axle 22.

As shown in Figure 9 of the drawings, the pivot pin 39 is carried by laterally spaced upstanding ears 40 on a plate 41 and the depending portion 38 of the beam 37 projects between the ears 40 for engagement with the pivot pin 39. It will be noted from Figure 9 of the drawings that the pivot pin 39 embodies a rubber bushing 42 which is held under compression between two metal sleeves 43 and 44. The outer metal sleeve 43 is secured to the beam 37 and the inner metal sleeve is secured to the ears 40 on the plate 41 so that the rubber bushing acts to yieldably maintain the beam 37 in its normal horizontal position shown in Figure 3 of the drawings.

The plate 41 is swivelly connected to the bracket 25 for rotation about a vertical axis which extends in a plane including the axis of the pivot pin 39 and the axis of the axle 22. As shown in Figure 3 of the drawings, a bearing plate 45 is fastened to the top of the bracket 25 with its top surface normally extending in a horizontal plane for engagement with a bearing ring 46 which is secured to the under surface of the plate 41. The bottom face of the plate 41 is recessed to receive a flanged coupling 47 which overlies the bearing ring 46 and has a central part which projects downwardly through the ring for engagement with the bearing plate 45. The flanged coupling 47 is coaxially arranged with respect to the axis of relative swivel movement of the parts and is secured to the plate 45 by a stud 48. As a result, the beam 37 and bracket 25 may swivel relative to one another. It will be apparent as this description proceeds that the aforesaid swivel connection contributes to providing relatively free movement of the axle under varying road conditions without unduly stressing the parts.

All of the axle assemblies disclosed herein are constructed in a manner identical to the axle assembly 20 and, hence, corresponding parts are designated by the same reference numerals. Each of the various axle assemblies is supported on the sprung assembly 10 for relatively free turning movement about a vertical axis spaced forwardly from the axle of the assembly and positioned midway between the ground engaging wheels. The axis of turning movement of the axle assembly 20 is designated in Figure 3 by the numeral 49 and is located in a common vertical plane with the axis of relative swivel movement between the bracket 25 and beam 37. In any case, the vertical axes of turning movement of the axle assemblies in either group 16 or 17 are so positioned that a caster effect is obtained and the ground engaging wheels 23 will accurately track with the vehicle steering wheels (not shown) when the course of travel of the vehicle is changed.

The mounting for each axle assembly is the same and reference is again made to Figure 3 of the drawings wherein the numeral 50 designates the mounting for the axle assembly 20. The mounting 50 comprises a stationary sleeve 51 coaxially arranged with respect to the vertical axis 49 and having the lower end welded or otherwise secured to the frame structure 52. As shown in Figure 4, the frame structure 52 forms a part of the sprung assembly and is spaced below the load supporting platform 14. The upper end of the sleeve 51 is connected to the underside of the platform 14 by circumferentially spaced arms 53. Journalled within the sleeve 51 is a tube 54 having the upper end projecting beyond the corresponding end of the sleeve 51 and rotatably supported on the sprung assembly 10. As shown in Figure 3, a part 55 has a reduced portion 56 which is telescoped into the upper end of the tube 54 and is welded or otherwise secured to the tube 54. The part 55 also has an enlarged cylindrical portion 57 which is journalled in a bearing 58 secured to the sprung assembly 10.

Secured to the lower end of the tube 54 is a part 59 having a trunnion 60 coaxially arranged with respect to the tube 54 and journalled in a bearing 61 which in turn is supported by a retainer 62. The bearing 61 may be identical to one of the bearings 30 previously described and may be adjustable to take up any wear or lost motion if desired. In any case, the retainer 62 is supported in a channel 63 which extends in a direction substantially parallel to the axle 22 and has the opposite ends secured to the supporting structure 52 by vertical braces 64, shown in Figure 4 of the drawings.

Secured to the lower end of the tube 54 is a yoke 65 having arms 66 (Fig. 7) projecting rearwardly and downwardly in lateral spaced relationship. The lower ends of the arms 66 have aligned openings therethrough for accommodating a pivot pin 67 having its axis extending parallel to the axis of the axle 22 and located in a common horizontal plane with the axis of the axle 22. The pivot pin 67 provides a pivotal connection between the lower ends of the arms 66 and the front end of an arm 68 which projects forwardly from the bracket 25 of the axle assembly 20. The front end of the arm 68 projects between the arms 66 and is apertured to receive the pivot pin 67. Thus, it will be seen that the axle assembly 20 may also swing vertically about the axis of the pivot pin 67 to accommodate irregularities in the terrain over which the ground engaging wheels 23 may be propelled. It will also be apparent from the foregoing that all of the axle assemblies have a caster effect and, hence, will turn about their respective vertical axes 49 in response to a change in the direction of travel of the vehicle.

Referring again to Figure 4 of the drawings, it will be noted that a pair of laterally spaced ears 69 project downwardly from the bottom of each of the channel members 63 and suitable shafts 70 are respectively journalled on the ears 69. The shafts 70 are supported with their axes extending parallel to the axes of the axles and the axes of the shafts 70 are located in a common horizontal plane with the axes of the axles and the pivot pins 67. Each shaft 70 rotatably supports a sprocket wheel 71 between the ears 69 and a length of chain 72 extends around the underside of each sprocket 71 in engagement with the teeth thereof. The upper ends of the length of chain engaged with the sprocket 71 between adjacent axles are respectively connected to adjacent ends of the beams 37. As shown in Figure 2 the length of the chain 72 engaged with the sprocket 71 spaced in advance of the front axle 16 has one end connected to the front end of the adjacent beam 37 and has the other end connected to the front end of a flexible linear member or cable 73 by a coupling 74. The rear end of the beam 37 associated with the rear axle assembly 21 is connected to the upper end of a length of chain 75. The chain 75 extends around a sprocket 76 which is rotatably supported on a bracket 77 carried by the sprung assembly 10, and the free end of the chain 75 is connected to the rear end of the cable 73 by a coupling 78. The cable 73 is reeved over pullies 79 suitably rotatably supported on the sprung assembly.

It follows from the above that all of the beams 37 of the axle assemblies in each group are serially connected to provide what may be termed a continuous suspension. The result of this suspension is indicated diagrammatically in Figure 10 of the drawings wherein the front and rear axle assemblies 18 and 21 respectively are shown in a lowered position with respect to the sprung assembly and the intermediate axle assemblies 19 and 20 are shown in a raised or elevated position. Such an arrangement affords greater vertical relative displacement between the sprung and unsprung assemblies for a given specified clearance between these assemblies and enables the vehicle to travel terrain which is considerably more irregular than terrain capable of being negotiated by vehicles not equipped with the above general type of suspension. It has been stated above that the rubber bushings 42 of the pivot pins 39 normally yieldably resist relative angular motion between the beams 37 and brackets 25 from their respective normal positions shown in Figure 3 of the drawings. Hence, these bushings 42 will serve to return the parts to their neutral or normal positions shown in Figure 3 of the drawings.

In order to permit the lateral shifting movement of the beams 37 required during turning movement of the axle assemblies about their respective vertical axes 49, the chains 72 are connected to the respective beams 37 by couplings 80 which are pivotally secured to the beams about axes extending at right angles to one another. A typical coupling 80 is shown in Figure 5 of the drawings wherein it will also be noted that the extremities of the beams 37 are bifurcated to receive the couplings therebetween. In detail, each coupling 80 has a part 81 which extends between the links of the adjacent length of the chain 72 and is pivoted to the chain by a pin 73. The part 81 has an elongated slot 82 for slidably receiving a second coupling part 83. The part 83 extends between the furcations at the end of the adjacent beam 37 and is pivoted thereto by a pin 84 which extends parallel to the pin 73. The upper end of the part 83 is pivoted to the part 81 by a pin 85 having its axis extending at right angles to the axis of the pin 84. In the assembly, the axes of the pins 84 extend parallel to the axes of the pivot pins 39 and the axes of the pivot pins 85 extend at right angles to the axes of the pivot pins 39. Thus, the couplings 80 provide in effect a universal joint connection between the lengths of chain and the beams 37. With this arrangement it is possible for the beams to move laterally without stressing the links of chain 72 and the associated sprockets 71.

Referring now to Figures 1, 4 and 6 of the drawings, it will be noted that an arm 86 has one end clamped to the upper end of each tube 54 in such a manner that the arms will rotate as a unit with the respective tubes 54. The free ends of the arms 86 are connected to pistons 87 which are respectively slidably supported in cylinders 88. The cylinders 88 are pivotally supported on the sprung assembly 10 to permit swinging movement of the cylinders in response to swinging movement of the arms 86. The arrangement is such that one cylinder and piston assembly is provided for each axle assembly and that the pistons 87 in the respective cylinders will be actuated by turning movement of the axle assemblies about their respective vertical axes 49.

The outer end of the cylinder 88 associated with the front axle assembly 16 is connected by a conduit 89 to the outer end of the cylinder 88 associated with the rear axle assembly 21. The inner end of the cylinder 88 associated with the front axle assembly 16 is connected by a conduit 90 to the corresponding end of the cylinder 88 associated with the rear axle assembly 21. The outer ends of the cylinders 88 respectively associated with the intermediate axle assemblies 19 and 20 are connected together by a conduit 91 and the inner ends of these cylinders are connected by a conduit 92. Thus, two independent fluid systems are provided for the axle assemblies in each of the groups 16 and 17. These systems are completely filled with a relatively non-compressible fluid medium so that they will serve as stabilizing means for the axles. In other words, the above arrangement is such that when the course of travel of the vehicle is changed and the axles are turned about their respective vertical axes 49 due to the turning thrusts applied to the ground engaging wheels 23, fluid in the respective stabilizing systems is merely displaced so that there is no appreciable resistance to normal turning movement of the axles. However, any external lateral forces applied to the ground engaging wheels 23 other than natural turning thrusts result in a difference in pressure in opposite sides of the hydraulic stabilizing systems and since the fluid in the latter is relatively non-compressible, such forces are prevented from turning the respective axles.

The hydraulic or relatively non-compressible fluid is supplied to the various stabilizing systems by pressurized reservoirs 93 which are connected to the stabilizing systems through aspirating valves 94. The particular construction of the hydraulic stabilizing systems, including the pressurized reservoir 93 and aspirating valves 94, is shown in detail in my copending application, Serial No. 327,231 entitled "Stabilizing Means for Vehicle Steering Axles" filed December 22, 1952, now Patent No. 2,761,693, dated September 4, 1956.

What I claim as my invention is:

1. A vehicle comprising a sprung assembly, an unsprung assembly having an axle and ground engaging wheels carried by the axle, a bracket having arms bridging opposite sides of the axle intermediate the ends of said axle, bearings respectively supported by the arms and having a common axis extending perpendicular to the axle in a horizontal plane, an element secured to the axle having trunnions respectively journaled in the bearings to permit swinging movement of the axle in a substantially vertical plane, means for supporting the sprung assembly on the unsprung assembly including a beam extending transversely of the axle above the bracket, and means pivotally connecting the beam intermediate the ends thereof to the bracket permitting relative pivotal movement of the beam and bracket about an axis extending parallel to the axle.

2. A vehicle comprising a sprung assembly, an unsprung assembly having an axle and ground engaging wheels carried by the axle, a bracket having arms bridging opposite sides of the axle intermediate the ends of said axle, bearings respectively supported by the arms and having a common axis extending perpendicular to the axle in a horizontal plane, an element secured to the axle having trunnions respectively journaled in the bearings to permit swinging movement of the axle in a substantially vertical plane, a connection between the sprung assembly and axle including a beam extending transversely of the axle above the bracket, a part carrying a pivot pin pivotally connected to the beam intermediate the ends thereof and having its axis extending parallel to the axle and located in a vertical plane including the axis of the axle, and a swivel connection between said part and bracket having its axis extending vertically in the plane aforesaid.

3. The structure defined in claim 2 comprising means supporting the axle for turning movement about a vertically extending axis spaced in advance of the axle intermediate the ends of the latter to provide a caster effect.

4. The structure defined in claim 3 comprising a stabilizer connected to said axle for stabilizing turning movement of said axle about said vertically extending axis.

5. A vehicle comprising a sprung assembly, an unsprung assembly having tandemly arranged axles and having ground engaging wheels carried by each axle, a suspension beam extending fore and aft of the unsprung assembly above each axle, a bracket pivoted to each axle intermediate the ends of the latter permitting swinging movement of each axle in a substantially vertical plane, means respectively pivotally connecting the brackets to the beams intermediate the ends of the latter permitting relative swinging movement of the brackets and beams about axes extending parallel to the axles, sprockets respectively supported on the sprung assembly between adjacent ends of the beams for rotation about axes extending substantially parallel to the axles and spaced below the beams, chains respectively connecting adjacent ends of the beams and respectively extending beneath the sprockets in engagement with the latter, and a connection between the rear end of the rearwardmost beam and the front end of the forwardmost beam.

6. A vehicle comprising a sprung assembly, an unsprung assembly having tandemly arranged axles and having ground engaging wheels carried by each axle, suspension beams extending fore and aft of the unsprung assembly above the respective axles and having portions intermediate the ends respectively pivoted to the axles permitting relative swinging movement of the axles and beams about axes extending parallel to the axles, an intermediate sprocket supported on the sprung assembly between adjacent axles in lateral spaced relation thereto and positioned below the beams, additional sprockets respectively positioned at the other sides of the axles aforesaid in lateral spaced relation to the latter axles and also spaced below said beams, means mounting all of said sprockets on the sprung assembly for rotation about axes extending substantially parallel to the axles, a length of chain extending around the underside of the intermediate sprocket in engagement with the latter sprocket and having the ends respectively connected to the adjacent ends of adjacent beams, and additional lengths of chain having ends respectively connected to the opposite ends of said adjacent beams and respectively extending around the under sides of the additional sprockets in engagement with the latter, and means connecting the opposite ends of said additional lengths of chain together.

7. The structure defined in claim 6 comprising means mounting the axles on the sprung assembly for turning movement about vertically extending axes respectively spaced ahead of the axles midway between the ground engaging wheels in positions to provide said axles with a caster effect, and means for stabilizing turning movement of said axles.

8. The structure defined in claim 6 comprising members supported on the sprung assembly for rotation about vertically extending axes respectively spaced ahead of the axles midway between the ground engaging wheels on said axles, arms extending forwardly from the respective axles midway between the ground engaging wheels and having the front ends respectively pivoted to the members for swinging movement about axes extending substantially parallel to the axes of the axles.

9. The structure defined in claim 8 comprising stabilizing means actuated by the members for stabilizing turning movement of the axles about the respective vertical axes of the members.

10. The structure defined in claim 9 comprising vertical supports for the respective members secured to the sprung assembly, and means at the lower ends of the respective supports for mounting those sprockets which are positioned in advance of the respective axles with the axes of the latter sprockets respectively located in common vertical planes with the axes of rotation of said members.

11. A vehicle comprising a sprung assembly, an unsprung assembly having tandemly arranged axles and having ground engaging wheels at opposite ends of the respective axles, a suspension beam extending fore and aft of the unsprung assembly above each axle, brackets respectively located between the axles and beams, means pivotally connecting the brackets to the respective axles intermediate the ends of the latter permitting swinging movement of the axles in vertical planes, mounting means respectively supported on the brackets for swivel movement about vertical axes, means pivotally connecting the mounting means to the respective beams intermediate the ends of the latter permitting relative pivotal movement of the beams and brackets about axes extending substantially parallel to the axles, a rotatable element supported on the sprung assembly between adjacent axles for rotation about an axis extending parallel to the axles and spaced below the beams, a flexible linear element having a portion intermediate the ends extending around the underside of said element and having the ends respectively connected to the adjacent ends of the beams above said adjacent axles, and a flexible linear element connecting the front end of the forwardmost beam to the rear end of the rearwardmost beam.

12. The structure defined in claim 11 comprising members mounted on the sprung assembly for rotation about vertical axes respectively spaced ahead of the axles midway between the ground engaging wheels on the axles, and arms projecting forwardly from the brackets and respectively connected to said members permitting turning movement of the axles and associated beams about the respective vertical axes of rotation of said members.

13. The structure defined in claim 12 wherein the connection between each arm and member comprises a pivot pin having its axis extending substantially parallel to the axles to permit vertical displacement of the respective axles about said pins.

14. The structure defined in claim 11 having yieldable means associated with the pivotal connections between the mounting means and beams for yieldably resisting tilting movement of the beams in either direction from normal horizontal positions.

15. A vehicle comprising a sprung assembly, an unsprung assembly having tandemly arranged axles and having ground engaging wheels at opposite ends of the respective axles, a suspension beam extending fore and aft of the unsprung assembly above each axle, brackets respectively located between the axles and beams, means pivotally connecting the brackets to the respective axles intermediate the ends of the latter permitting swinging movement of the axles in vertical planes, mounting means respectively supported on the brackets for swivel movement about vertical axes, means pivotally connecting the mounting means to the respective beams intermediate the ends of the latter permitting relative pivotal movement of the beams and brackets about axes extending substantially parallel to the axles, a rotatable element supported on the sprung assembly between adjacent axles for rotation about an axis extending parallel to the axles and spaced below the beams, a flexible linear element having a portion intermediate the ends extending around the underside of said element and having the ends respectively connected to the adjacent ends of the beams above said adjacent axles, a second rotatable element supported on the sprung assembly for rotation about an axis extending substantially parallel to the axes of the axles and spaced ahead of the forwardmost axle below the beam associated with the latter axle, a third rotatable element supported on the sprung assembly for rotation about an axis extending substantially parallel to the axes of the axles and spaced rearwardly from the rear axle below the rear beam, a second flexible linear element having one end connected to the front end of the forwardmost beam and extending downwardly around the underside of the second rotatable element, a third flexible linear element having one end connected to the rear end of the rear beam and extending downwardly around the underside of the third rotatable element, and a connection between the free ends of the second and third linear elements.

16. The structure defined in claim 15 having means pivotally connecting the respective brackets to the sprung assembly including pivot pins spaced ahead of the respective axles and having their axes extending substantially parallel to the axles.

17. A vehicle comprising a sprung assembly, an unsprung assembly having tandemly arranged axles and having ground engaging wheels carried by each axle, suspension beams respectively extending fore and aft of the unsprung assembly above the respective axles and having portions intermediate the ends respectively pivotally connected to the axles permitting relative swinging movement of the axles and beams about axes extending substantially parallel to the axles, supports depending from the sprung assembly and spaced forwardly from the respective axles, members respectively mounted on the supports for rotation about vertically extending axes spaced in advance of the respective axles and positioned midway between the ground engaging wheels on the respective axles, a connection between each axle and the member spaced forwardly from said axle permitting turning movement of the axles about the respective axes of rotation of said members, sprockets respectively mounted on the supports for rotation about axes extending substantially parallel to the axles and spaced below the beams, lengths of chain respectively having portions intermediate the ends extending beneath the sprockets between adjacent axles in engagement with the latter sprockets and having the ends respectively connected to the adjacent ends of adjacent beams, a length of chain having the rear end connected to the front end of the forwardmost beam and extending beneath the sprocket on the support in advance of the forwardmost axle, and a connection between the front end of the last named length of chain and the rear end of the beam associated with the rearwardmost axle.

18. A vehicle comprising a sprung assembly, an unsprung assembly having an axle and ground engaging wheels carried by the axle, a bracket having arms bridging opposite sides of the axle intermediate the ends of said axle, bearings respectively supported by the arms and having a common axis extending perpendicular to the axle in a horizontal plane, an element secured to the axle having trunnions respectively journaled in the bearings to permit swinging movement of the axle in a substantially vertical plane, a member supported on the sprung assembly for rotation about a vertically extending axis positioned midway between the ground engaging wheels and spaced in advance of the axle, a connection between the bracket and member permitting turning movement of the axle about the axis of rotation of said member, said connection comprising an arm projecting forwardly from said bracket and pivoted to said member for swinging movement about an axis extending substantially parallel to the axle, and stabilizing means connected to said member for stabilizing turning movement of said axle.

19. A vehicle comprising a sprung assembly, an unsprung assembly having an axle and ground engaging wheels carried by the axle, a bracket having arms bridging opposite sides of the axle intermediate the ends of said axle, bearings respectively supported by the arms and having a common axis extending perpendicular to the axle in a horizontal plane, an element secured to the axle having trunnions respectively journaled in the bearings to permit swinging movement of the axle in a substantially vertical plane, a member supported on the sprung assembly for rotation about a vertically extending axis positioned midway between the ground engaging wheels and spaced in advance of the axle, a connection between the bracket and member permitting turning movement of the axle about the axis of rotation of said member, said connection comprising an arm projecting forwardly from said bracket and pivoted to said member for swinging movement about an axis extending substantially parallel to the axle.

20. A vehicle comprising a sprung assembly, an unsprung assembly having tandemly arranged axles and having ground engaging wheels carried by said axles, suspension beams extending fore and aft of said unsprung assembly above the respective axles and having portions intermediate the ends thereof respectively pivoted to said axles permitting relative swinging movement of said axles about axes extending parallel to said axles, guide means supported on said sprung assembly between adjacent ends of said beams and spaced below the latter, flexible linear means extending beneath said guide means in engagement with the latter and having the ends respectively connected to adjacent ends of said beams, and said guide means being rotatable to facilitate movement of said flexible linear means relative to said guide means, and means including a connection between the rear end of the rearwardmost beam and the front end of the forwardmost beam providing for a coordinated translatory movement of the rear end of the rearwardmost beam and the front end of the forwardmost beam independently of said sprung assembly.

21. A vehicle comprising a sprung assembly, an unsprung assembly having tandemly arranged axles and having ground engaging wheels carried by said axles, suspension beams extending fore and aft of said unsprung assembly above the respective axles and having portions intermediate the ends thereof respectively connected to said axles, guide means supported on said sprung assembly between adjacent ends of said beams and spaced below said beams, flexible linear means extending beneath said guide means in engagement with the latter and having the ends respectively connected to adjacent ends of said beams, and means including a connection between the rear end of the rearwardmost beam and the front end of the forwardmost beam providing for a coordinated translatory movement of the rear end of the rearwardmost beam and the front end of the forwardmost beam independently of said sprung assembly.

22. A vehicle comprising a sprung assembly, an unsprung assembly having tandemly arranged axles and having ground engaging wheels carried by each axle, suspension beams extending fore and aft of said unsprung assembly above the respective axles and having portions intermediate the ends connected to said respective axles, rotatable elements supported on said sprung assembly between adjacent ends of said beams for rotation about axes extending parallel to said axles and spaced below said beams, flexible linear elements having intermediate portions extending around the underside of said respective rotatable elements and having the ends connected to the adjacent ends of said beams, and means including a connection between the rear end of the rearwardmost beam and the front end of the forwardmost beam providing for a coordinated translatory movement of the rear end of the rearwardmost beam and the front end of the forwardmost beam independently of said sprung assembly.

23. Structure as defined in claim 22, in which said connection comprises a flexible linear element.

24. Structure as defined in claim 22 in which means are provided for pivotally connecting the intermediate portions of said beams to said respective axles permitting swinging movement of said axles about axes parallel to said axles.

25. A vehicle comprising a sprung assembly, an unsprung assembly having tandemly arranged axles and having ground engaging wheels carried by said axles, supports for said respective axles, said supports being mounted on said sprung assembly and spaced from said respective axles lengthwise of said vehicle, means connecting each axle to the support immediately in advance thereof including an arm extending forwardly from each axle and pivotally connected to the associated support for rotation of said arm and axle about an axis extending parallel to said axle and spaced forwardly from said axle, suspension beams extending fore and aft of said unsprung assembly above the respective axles and having portions intermediate the ends thereof respectively connected to said axles, guide means supported on said sprung assembly between adjacent ends of said beams and spaced below said beams, flexible linear means extending beneath said guide means in engagement with the latter and having the ends respectively connected to adjacent ends of said beams, and means including a connection between the rear end of the rearwardmost beam and the front end of the forwardmost beam providing for a coordinated translatory movement of the rear end of the rearwardmost beam and the front end of the forwardmost beam independently of said sprung assembly.

26. A vehicle comprising a sprung assembly, an unsprung assembly having tandemly arranged axles and having ground engaging wheels carried by said axles, supports for said respective axles depending from said sprung assembly and spaced in advance of said respective axles means connecting each axle to the support immediately in advance thereof including an arm extending forwardly from each axle and pivotally connected to the associated support for rotation of said arm and axle about an axis extending parallel to said axle and spaced in advance of said axle, rotatable elements supported on said sprung assembly between adjacent ends of said beams for rotation about axes extending parallel to said axles and spaced below said beams, flexible linear elements having intermediate portions extending around the underside of said respective rotatable elements and having the ends connected to the adjacent ends of said beams, and means including a connection between the rear end of the rearwardmost beam and the front end of the forwardmost beam providing for a coordinated translatory movement of the rear end of the rearwardmost beam and the front end of the forwardmost beam independently of said sprung assembly.

27. Structure as defined in claim 26 in which means are provided for pivotally connecting the intermediate portions of said beams to said respective axles permitting swinging movement of said axles about axes parallel to said axles.

28. A vehicle comprising a sprung assembly, an unsprung assembly having an axle and ground engaging wheels carried by the axle, a bracket, means pivotally connecting said bracket to said axle intermediate the ends of said axle for swinging movement of said axle relative to said bracket in a substantially vertical plane, a member supported on the sprung assembly for rotation about a vertically extending axis positioned midway between the ground engaging wheels and spaced in advance of the axle, a connection between the bracket and member permitting turning movement of the axle about the axis of rotation of said member, said connection comprising an arm projecting forwardly from said bracket and pivoted to said member for swinging movement about an axis extending substantially parallel to the axle.

References Cited in the file of this patent
UNITED STATES PATENTS

| | | |
|---|---|---|
| 1,833,053 | McManus | Nov. 24, 1931 |
| 1,893,695 | Chenoweth | Jan. 10, 1933 |
| 2,599,469 | Merry | June 3, 1952 |
| 2,624,593 | Stover | Jan. 6, 1953 |
| 2,635,897 | Kendall | Apr. 21, 1953 |